UNITED STATES PATENT OFFICE.

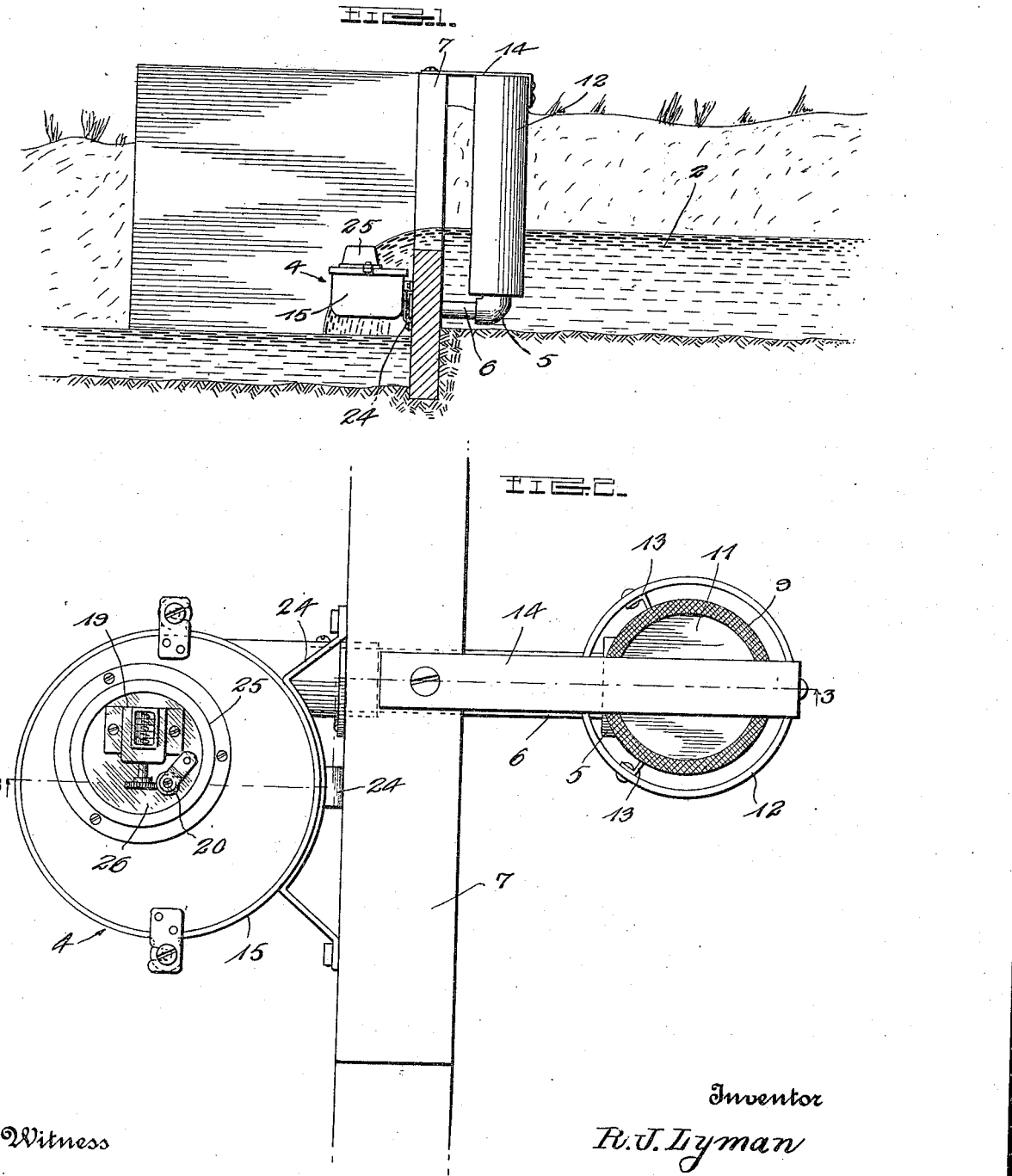

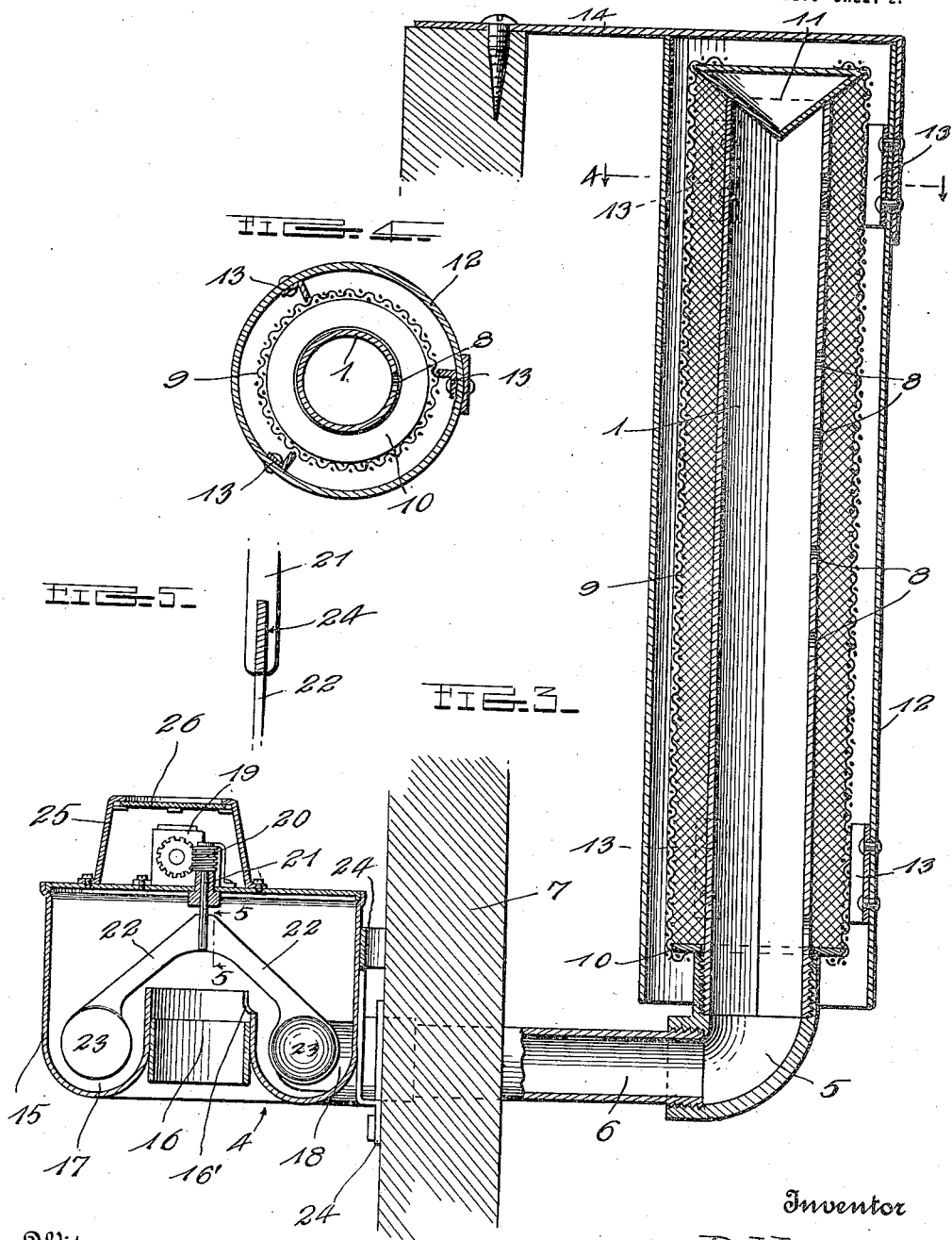

RAY JAY LYMAN, OF BERKELEY, CALIFORNIA.

WATER METER.

1,425,876. Specification of Letters Patent. Patented Aug. 15, 1922.

Application filed July 18, 1919. Serial No. 311,701.

*To all whom it may concern:*

Be it known that I, RAY JAY LYMAN, a citizen of the United States, residing at Berkeley, in the county of Alameda and State of California, have invented certain new and useful Improvements in Water Meters; and I do declare the following to be a full, clear, and exact description of the invention, such as will enable others skilled in the art to which it appertains to make and use the same.

My invention relates to water meters and the present embodiment thereof is intended principally for use in connection with weirs, dams, orifices and the like, as employed in connection with irrigating systems and the principal object of the invention is to provide a simple, inexpensive and easily installed meter which will not become clogged by trash, silt and the like, and which will accurately register the amount of water consumed.

With the foregoing in view, the invention resides in the novel construction and arrangement of parts hereinafter described and claimed, the descriptive matter being supplemented by the accompanying drawings which form a part of this application.

Figure 1 is a side elevation of the improved water meter showing its application to a weir.

Fig. 2 is a top plan view of the meter and a portion of the weir.

Fig. 3 is a vertical section as indicated by line 3—3 of Fig. 2.

Fig. 4 is a horizontal section on the plane indicated by line 4—4 of Fig. 3.

Fig. 5 is a detail section on the plane indicated by line 5—5 of Fig. 3.

In carrying out my invention I provide a water operated meter, and employ means to supply a stream to said meter from a body of water, and for increasing or decreasing the stream, in proportion to the rise and fall of the water level of said body, and I by preference employ the novel features of construction described below, since they have in actual use proven to be highly efficient and in every way desirable.

The numeral 1 designates a passage member preferably in the form of a single vertical tube adapted for reception in a body of water such as 2, the lower end of said passage member discharging into a water operated meter 4. When the passage member is in the form of a tube, I connect its lower end by an elbow 5 with a lateral branch 6 which may extend through a weir wall or the like 7 to the meter 4, the tube being located on the upstream side of the wall, orifice, or the like, while the meter is located on the opposite side thereof and preferably to one side of the stream of water passing through the opening. The size of the stream of water discharged into the meter 4 and its consequent strength controls the registering of the latter and in order that the size of said stream may increase or diminish in proportion to the rise and fall of the water level in the body 2, I provide the passage member 1 with vertically spaced openings 8. When the water level is low and the meter is supplied with water from only one or more of the lowermost openings 8, said meter will not of course record rapidly. However, when the water level rises and more water passes over the dam, weir, orifice, or the like, the passage member 1 is supplied with water through more of the openings 8, with the result that the meter 4 is driven proportionately faster.

I prefer to surround the tube 1 with a tubular screen 9 which may well be provided with a ring 10 at its bottom resting on the elbow 5, and with an inverted cone shaped top 11 receivable in the upper end of said tube 1, to center the screen. Surrounding the screen 9, is a tubular jacket 12 which is spaced from said screen by suitable flanges or the like 13 contacting therewith. The jacket 12 is provided with suitable anchoring means, such as the arm 14 secured to its upper end and adapted to be nailed or otherwise attached to the weir or the like.

The meter 4 is preferably constructed as shown most clearly in Figs. 2 and 3. The meter in question is provided with a cylindrical casing 15 with its axis disposed vertically, the bottom of said casing having a central water outlet 16, a continuous water channel 17 around said outlet, and a water inlet 18 discharging tangentially into said channel, said inlet communicating with the aforesaid member 1 by means of the branch 6 or otherwise. The inner edge of the channel 17 is provided with a notch 16' leading to the outlet 16 to render the meter more sensitive when used in connection with weak water heads. On top of the casing 15 or located in any other preferred manner, is a counting device 19 driven by suitable gearing 20 from a short vertical shaft 21 whose lower end extends into the casing. The gear ratio may of course be varied according to the conditions encountered when installing the device. Shaft 21 is provided with depending arms 22 having paddles 23 on their lower ends traveling in the channel 17. The paddles 23 are preferably of spoon shape and these paddles together with their carrying arms 22 may well be stamped from a single piece of sheet metal, the joined upper ends of said arms being attached in any suitable manner to the shaft 21, for instance by securing said attached ends in a vertical slot 24 formed in said shaft as seen in Fig. 5. The stream of water entering the channel 17 acts against the paddles 23 and thus serves to rotate shaft 21 and drive the counter 19, thereby accurately registering the consumption of water in acre-feet or other desired units of measurement. The channel is at all times filled with water, but the movement of the current and consequently the speed of the counting device is controlled by the strength of the stream supplied to the casing 15 from the passage member 1, and this stream is in turn controlled by the level of water of the body 2.

Any preferred means such as brackets 24 may be employed to secure the casing 15 to the weir wall or the like 7, a casing 25 having a transparent top 26, will in most instances be provided for the counter 19 and the gearing 20, and if desired the entire meter 4 may be encased in a box or the like having openings to allow the water to escape as it is discharged from the outlet 16.

The device is comparatively simple and inexpensive, may be easily attached, will be efficient and reliable in operation, cannot be easily tampered with, and will not clog from silt, trash and the like, due to the jacket 12 and the screen 9. The lower end of the jacket is at all times submerged and consequently any trash and the like floating on the surface of the water cannot enter the passage member 1. In case any foreign matter should gain entrance to the jacket 12, it is excluded from the passage member 1 by the screen 9.

When the device is used in connection with submerged orifices, the vertical side wall of casing 15 may be of considerably greater height than when used with weirs as shown, and it is to be fully understood that my invention is not restricted to use with weirs or with any other specific features of irrigation systems.

Since probably the best results may be obtained from the details disclosed, they may well be followed, but within the scope of the invention as claimed, the device may be embodied in numerous forms other than that shown.

I claim:

1. The combination with a water damming device extending across a stream, of a water meter at the down-stream side of said damming device, an upstanding passage in the body of water trapped by said damming device, said passage having a series of vertically spaced water inlet openings, the endmost of which are located approximately at high and low water levels respectively, and a connection extending laterally from the lower end of said passage to the downstream side of said water damming device and discharging into said water meter.

2. In a water meter supply means, a tube adapted for vertical disposition in a body of water, said tube having vertically spaced openings to admit a greater or lesser quantity of water to said tube as the level of said body rises and falls respectively, and a tubular jacket surrounding said tube in spaced relation thereto and having an open lower end adapted to at all times be submerged, whereby to prevent trash and the like floating on the surface of the water from entering said tube.

3. In a water meter supply means, a tube adapted for vertical disposition in a body of water, said tube having vertically spaced openings to admit a greater or lesser quantity of water to said tube as the level of said body rises and falls respectively, and a tubular screen surrounding said tube, a tubular jacket surrounding said screen in spaced relation thereto, and having an open lower end adapted to at all times be submerged, whereby to prevent trash and the like on the surface of the water from entering said tube.

4. In a water meter supply means, a tube adapted for vertical disposition in a body of water, said tube having vertically spaced openings to admit a greater or lesser quantity of water to said tube as the level of said body rises and falls respectively, a tubular screen surrounding said tube in spaced relation therewith and having an inverted cone closing its upper end and resting in the upper end of said tube to center said screen, and a tubular open ended jacket surrounding said screen in spaced relation thereto and having spacers contacting with the outer side of said screen.

5. A water meter supply means comprising a tube for vertical disposition in a body of water and adapted to extend above the water-level, the lower end of said tube having means for placing it in communication with a water meter, the side of said tube being provided with vertically spaced openings for admitting water proportionately to the rise and fall of the water head, the endmost of said openings being adapted for location approximately at high and low water levels, respectively.

In testimony whereof I have hereunto set my hand.

RAY JAY LYMAN.